(12) United States Patent
Wang et al.

(10) Patent No.: US 11,218,626 B2
(45) Date of Patent: Jan. 4, 2022

(54) FAST FOCUS USING DUAL CAMERAS (71) Applicant: Black Sesame International Holding Limited, Santa Clara, CA (US)

(72) Inventors: Chao Wang, Shanghai (CN); Jizhang Shan, Los Gatos, CA (US)

(73) Assignee: Black Sesame International Holding Limited, San Jose, CA (US)

( * ) Notice: Subject to any disclaimer, the term of this patent is extended or adjusted under 35 U.S.C. 154(b) by 0 days.

(21) Appl. No.: 16/010,105

(22) Filed: Jun. 15, 2018

(65) Prior Publication Data

US 2019/0037128 A1    Jan. 31, 2019

Related U.S. Application Data (60) Provisional application No. 62/538,613, filed on Jul. 28, 2017.

(51) Int. Cl.
 *H04N 5/232* (2006.01)
 *G06T 3/00* (2006.01)
 *G06T 5/00* (2006.01)
 *G06T 7/571* (2017.01)
 *H04N 17/00* (2006.01)
 *H04N 5/225* (2006.01)

(52) U.S. Cl.
 CPC ....... *H04N 5/23212* (2013.01); *G06T 3/0068* (2013.01); *G06T 5/006* (2013.01); *G06T 7/571* (2017.01); *H04N 5/2258* (2013.01); *H04N 17/002* (2013.01)

(58) Field of Classification Search
 CPC ............ H04N 5/23212; H04N 5/2258; H04N 17/002; G06T 7/571; G06T 3/0068; G06T 5/006
 See application file for complete search history.

(56) References Cited

U.S. PATENT DOCUMENTS

| | | | | |
|---|---|---|---|---|
| 2004/0061712 A1* | 4/2004 | Sogawa | ................. | G01C 11/06 345/698 |
| 2008/0218613 A1* | 9/2008 | Janson | ................. | H04N 5/2258 348/262 |
| 2011/0268358 A1* | 11/2011 | Ikebe | ...................... | G06T 5/008 382/172 |
| 2013/0155266 A1* | 6/2013 | Zhou | ................. | H04N 5/23258 348/208.99 |
| 2014/0160245 A1* | 6/2014 | Cheng | ................. | H04N 13/296 348/47 |
| 2014/0177927 A1* | 6/2014 | Shieh | ..................... | G06T 7/593 382/108 |
| 2015/0304527 A1* | 10/2015 | Chou | .................. | H04N 17/004 348/187 |

(Continued)

*Primary Examiner* — Jason A Flohre
(74) *Attorney, Agent, or Firm* — Timothy T. Wang; Ni, Wang & Massand, PLLC (57) ABSTRACT A method of focusing dual cameras including receiving a fixed focus image from a fixed focus camera module, receiving an auto focus image from an auto focus camera module, calibrating a lens distortion of the auto focus camera module, calibrating a geometric relation of the auto focus camera module and the fixed focus camera module, calculating a depth of focus difference between the fixed focus image and the auto focus image, estimating an auto focus position based on the depth of focus difference and setting the auto focus position based on the estimation.

19 Claims, 7 Drawing Sheets (56) References Cited

U.S. PATENT DOCUMENTS

| | | | |
|---|---|---|---|
| 2016/0182821 A1* | 6/2016 | Shabtay | H04N 5/2258 348/239 |
| 2016/0212406 A1* | 7/2016 | Hayasaka | H04N 5/23238 |
| 2016/0295097 A1* | 10/2016 | Shanmugavadivelu | H04N 5/2254 |
| 2017/0070731 A1* | 3/2017 | Darling | G06T 7/85 |
| 2017/0150126 A1* | 5/2017 | Kim | H04N 5/2257 |
| 2017/0155896 A1* | 6/2017 | Malaescu | H04N 5/23212 |
| 2017/0230585 A1* | 8/2017 | Nash | H04N 5/23241 |
| 2017/0359534 A1* | 12/2017 | Li | G06T 5/50 |
| 2018/0041689 A1* | 2/2018 | Cui | H04N 5/23212 |
| 2018/0376068 A1* | 12/2018 | Shimatani | H04N 5/23258 |
| 2019/0253644 A1* | 8/2019 | Zhu | H04N 5/347 |

\* cited by examiner

FAST FOCUS USING DUAL CAMERAS

BACKGROUND

Technical Field

The instant disclosure is related to digital photography and more specifically to camera focusing using two cameras.

Background

In general, focus adjustment in a camera system involves image sharpness analysis or phase detection and lens position mechanical control. A challenge in the sharpness analysis method, i.e. contrast AF, is the latency due to recursive lens movement and image analysis until a fine focus position is reached. To reduce this latency, a phase detection (PD) sensor is designed which can use a specialized pixel to detect a phase related to a distance. PD sensors are expensive and decrease pixel sensitivity and thus decrease the low light performance of the camera.

SUMMARY

In one embodiment a method of focusing dual cameras includes receiving a fixed focus image from a fixed focus camera module, receiving an auto focus image from an auto focus camera module, calculating a depth of focus difference between the fixed focus image and the auto focus image, estimating an auto focus position based on the depth of focus difference and setting the auto focus position based on the estimation.

In another embodiment a method of focusing dual cameras includes receiving a fixed focus image from a fixed focus camera module, receiving an auto focus image from an auto focus camera module, calibrating a lens distortion of the auto focus camera module, calibrating a geometric relation of the auto focus camera module and the fixed focus camera module, calculating a depth of focus difference between the fixed focus image and the auto focus image, estimating an auto focus position based on the depth of focus difference and setting the auto focus position based on the estimation.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but, not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
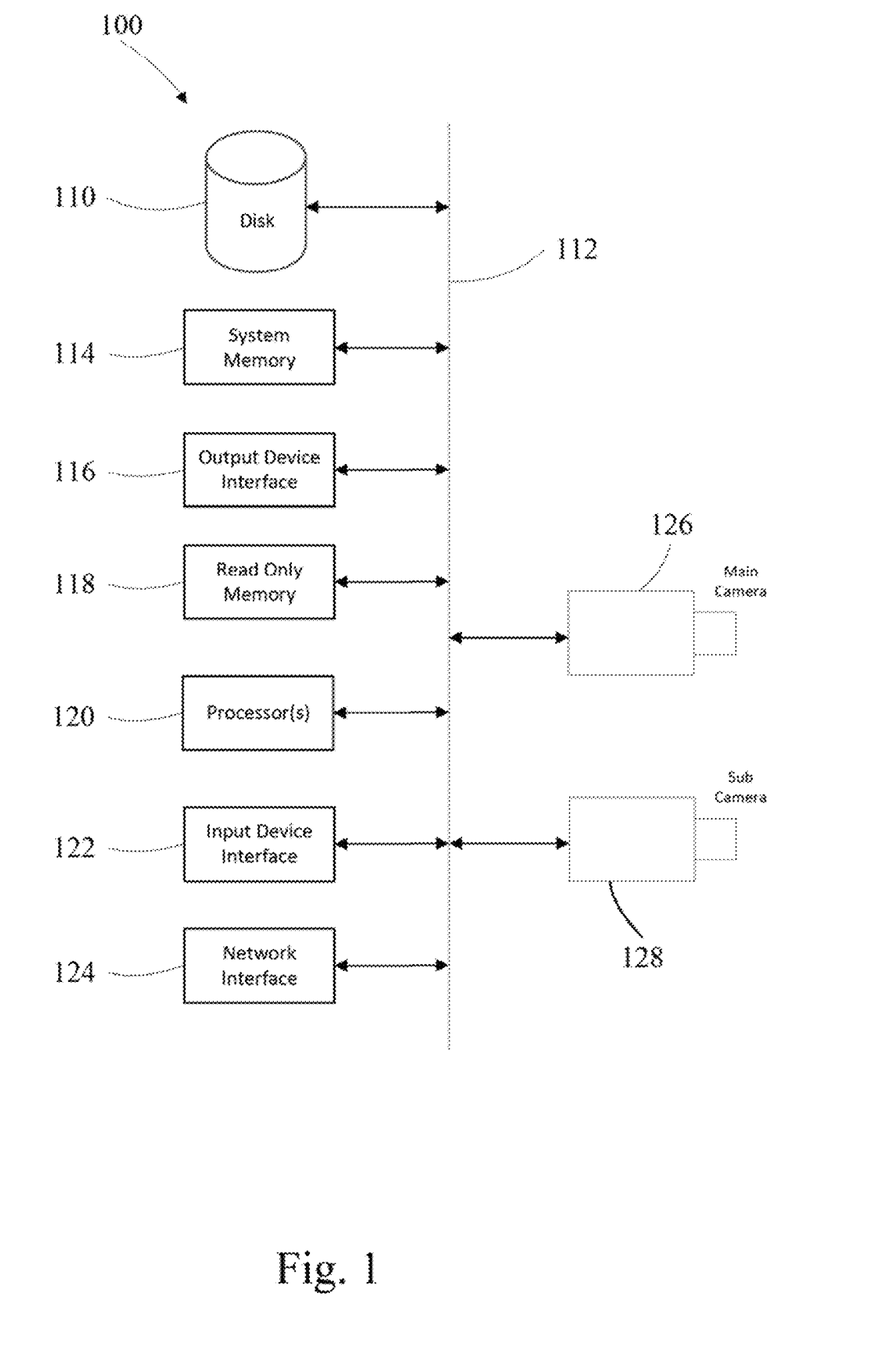
FIG. 1 is a system diagram in accordance with one embodiment of the disclosure.

FIG. 1 depicts an example electronic system for use in connection with a system having dual cameras. Electronic system 100 may be a computing device for execution of software associated with the operation of one or more portions or steps of process 500, 600 or 700, or components and processes provided by FIGS. 5-7. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interlaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the auto focus camera module sensor 126 (main camera) and the fixed focus camera module 128 (sub camera).

Bus 112 collectively represents all system, peripheral, and chipset buses that communicatively connect the numerous internal devices of electronic system 100. For instance, bus 112 communicatively connects processor(s) 120 with RUM 118, system memory 114, permanent storage device 110, auto focus camera module sensor 126 (main camera) and fixed focus camera module 128 (sub camera).

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client server relationship to each other. Data generated at the client device (e.g., a result of the user interaction) can be received from the client device at the server.

Figure 2:
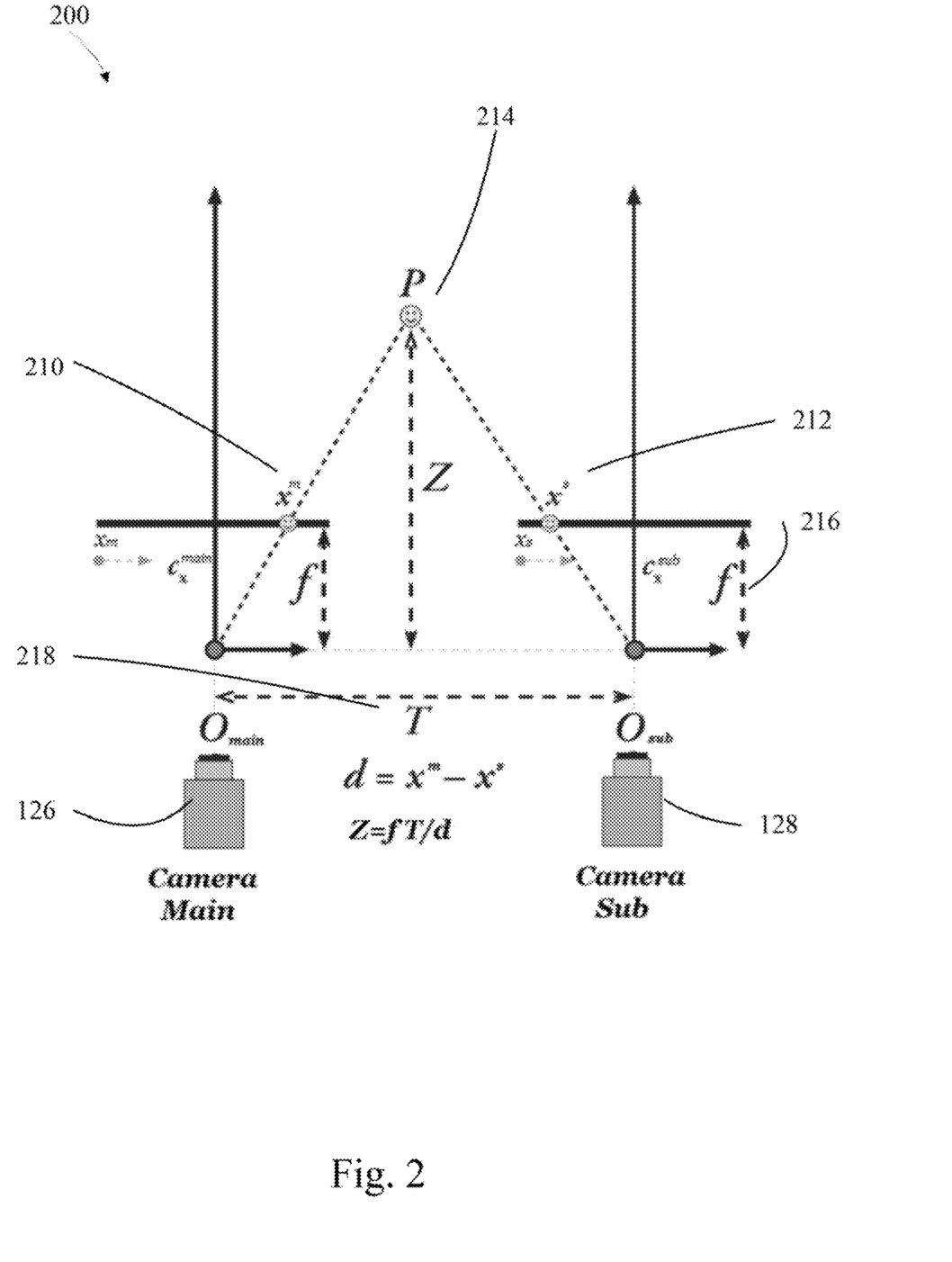
FIG. 2 is a system diagram showing parallax in accordance with one embodiment of the disclosure.

FIG. 2 depicts the disparity related to the distance due to parallax in the dual camera system. In a perfectly undistorted aligned stereo rig with known correspondence, the depth Z can be found using the similar triangles method; the principal rays of the imagers begin at the centers of projection $O_{main}$ and $O_{sub}$ and extend through the principal points of the two image planes at $c_x^{main}$ and $c_x^{sub}$.

This fast focus camera system consists of a fixed focus camera module (sub camera) and an auto focus camera module (main camera). The fixed focus camera module may have a larger depth of field (DOF) optical element to cover a wider range of focus distances. Before the main camera reaches a correct focus position, the main camera delivers a current image. The fast focus algorithm calculates the disparity between the object/scene in the main camera current lens position image and that in the fixed focus camera image to determine the next focus position that the main camera should move to. Then the lens position mechanical control module, a voice coil motor (VCM) moves the lens to such a position and the main camera delivers the new position image for the algorithm to confirm whether it has reached the desire focus position.

A VCM is often categorized into closed loop VCMs and open loop VCMs. Closed loop VCM are less affected by the motor pose and hence are more robust to the effects of gravity. The main camera VCM in this instance is the portion that is calibrated due to the sub camera module having a fixed focused.

In a closed loop VCM, the main camera is shooting at different targets at different distances, the VCM controls the lens position step by step and the offline sharpness analysis may find the sharpest lens position for each target. A look-up table is then built into the device which maps a distance to the VCM position.

In an open loop VCM, the operation is more complex. The main camera lens position is not directly controlled by the VCM, and is also affected by gravity. The afore-mentioned look-up tables are built for different camera poses respectively.

The goal of the lens distortion calibration and correction is to reduce and or eliminate the unwanted distortion caused by the spherical lens, and correct the image to imitate that of a pinhole camera.

The purpose of geometrical calibration estimates the relative pose, relative position and relative scale between the two cameras. After applying these parameters to the images, the two images may be aligned along a baseline direction, thus simplifying the stereo matching.

Figure 3:
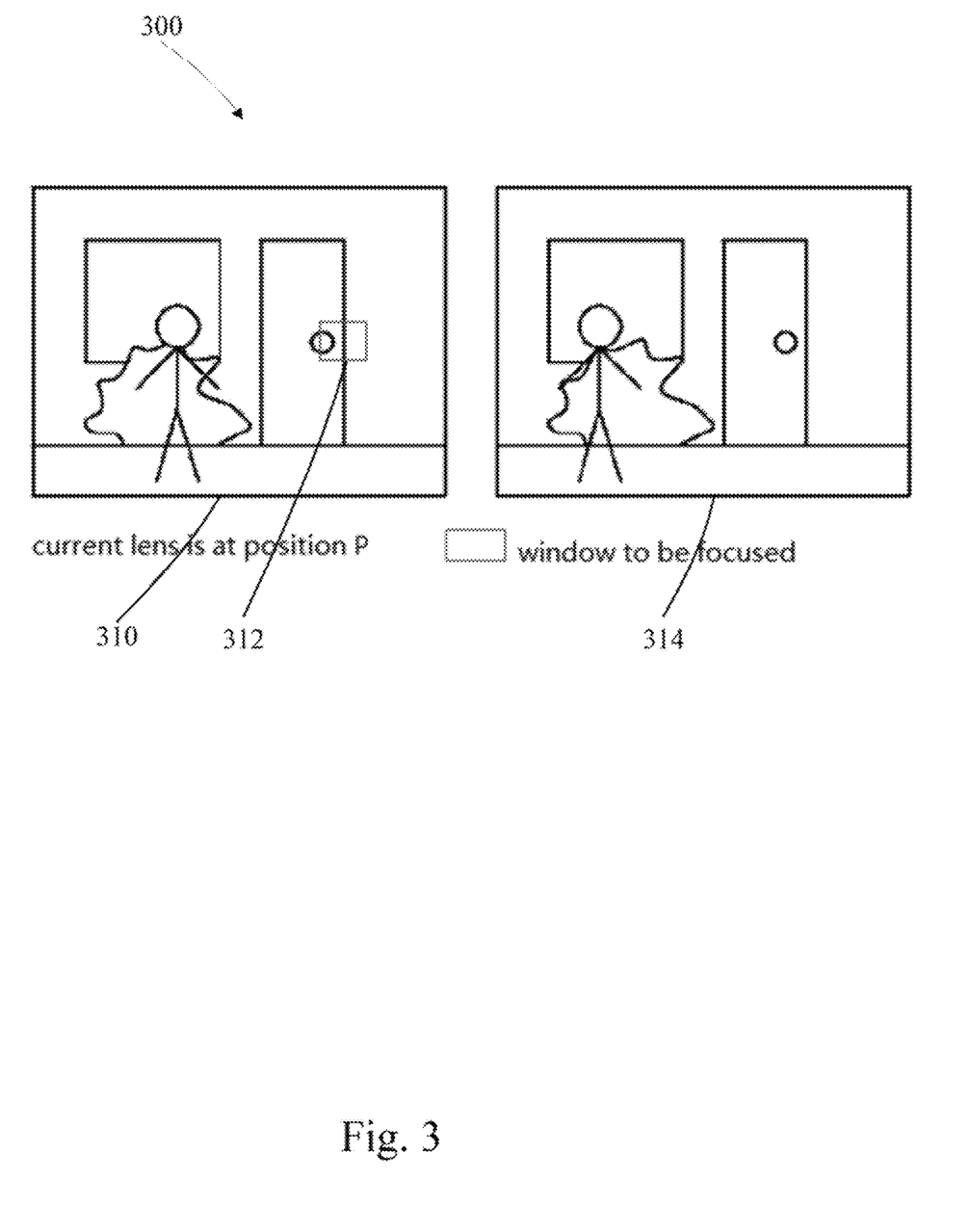
FIG. 3 is a depiction of a focus window in an auto focus image in accordance with one embodiment of the disclosure.

FIG. 3 depicts the triggered fast focus function, from a current lens position the fast focus camera system delivers (1) an image ($I_M$) captured by the main, auto focus camera module; (2) an image ($I_S$) captured by the second, fixed focus camera module; (3) the current status of the main, auto focus camera module; and (4) the focus window ($W_M$) in the image $I_M$.

Shown are images captured by the main camera module $I_M$, the second camera module $I_S$, with the current lens position and the focus window $W_M$.

Before subsequent focus window matches, correction is applied to the input data, including the lens distortion correction and the geometric alignment. The image pair may be aligned and similar features will be present in the same horizontal scan-lines in the main and sub cameras. A second correction may be brightness correction, using a histogram specification, correcting the two images to have similar brightness on the same captured object.

Figure 4:
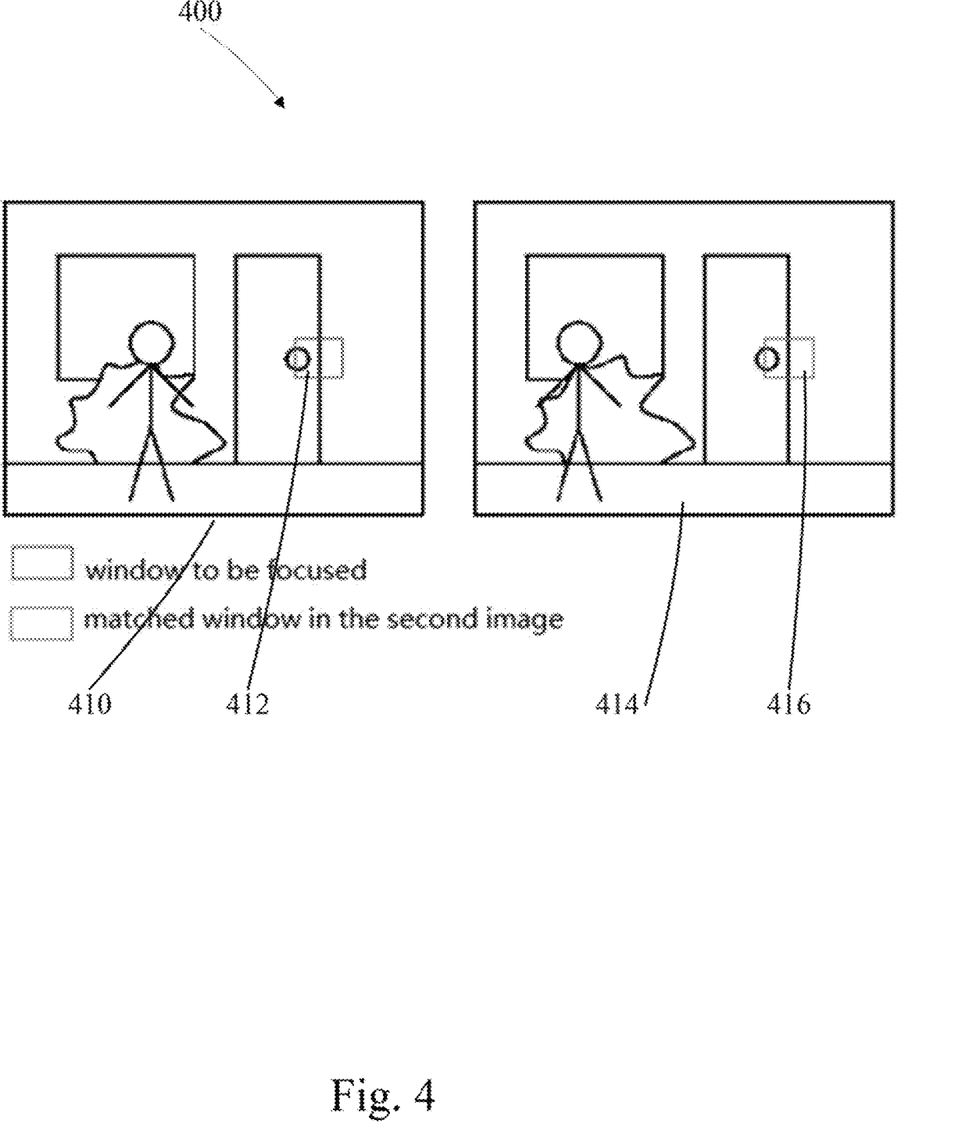
FIG. 4 is a depiction of focus windows in an auto focus image and a fixed focus image in accordance with one embodiment of the disclosure.

As shown in FIG. 4, given the image data of $I_M$ within the given focus window $W_M$, a second window ($W_S$) in the second image $I_S$ is found which contains the same physical area as $W_M$ in $I_M$. Generally, this searching process is conducted along corresponding epipolar lines of the center of $W_M$. Because of the aforementioned distortion and geometric correction, the epipolar line will be the horizontal scanline. $I_S$ which may be found using different methods, such as sum of absolute differences (SAD), maximum correlation coefficients (MCC) and the like.

For the position (coordinates) of $W_M$ in the main image and those of $W_S$ in the second image, they are mapped to a rectified coordinates system, denoted as $X_M$ in the main rectified image and $X_S$, in the second rectified image. The difference between $X_M$ and $X_S$, or namely the disparity, conveys the depth information of the content within such focusing window.

$$depth = \frac{focal\ length \times baseline}{X_M - X_S}$$

The focal length is measured in rectified pixel intervals, baseline is the true physical distance between the optical centers of the two cameras. $x_M$ and $x_S$ are the horizontal (parallel to the baseline direction) coordinates of the contents in the two windows of the rectified images.

For each auto focus module, given the focusing distance, the best lens position may be estimated according to the current status of the module, including but not limited to camera pose and the motor calibration data. Then the lens position of the main camera will be adjusted to this new value in the next frame(s).

Figure 5:
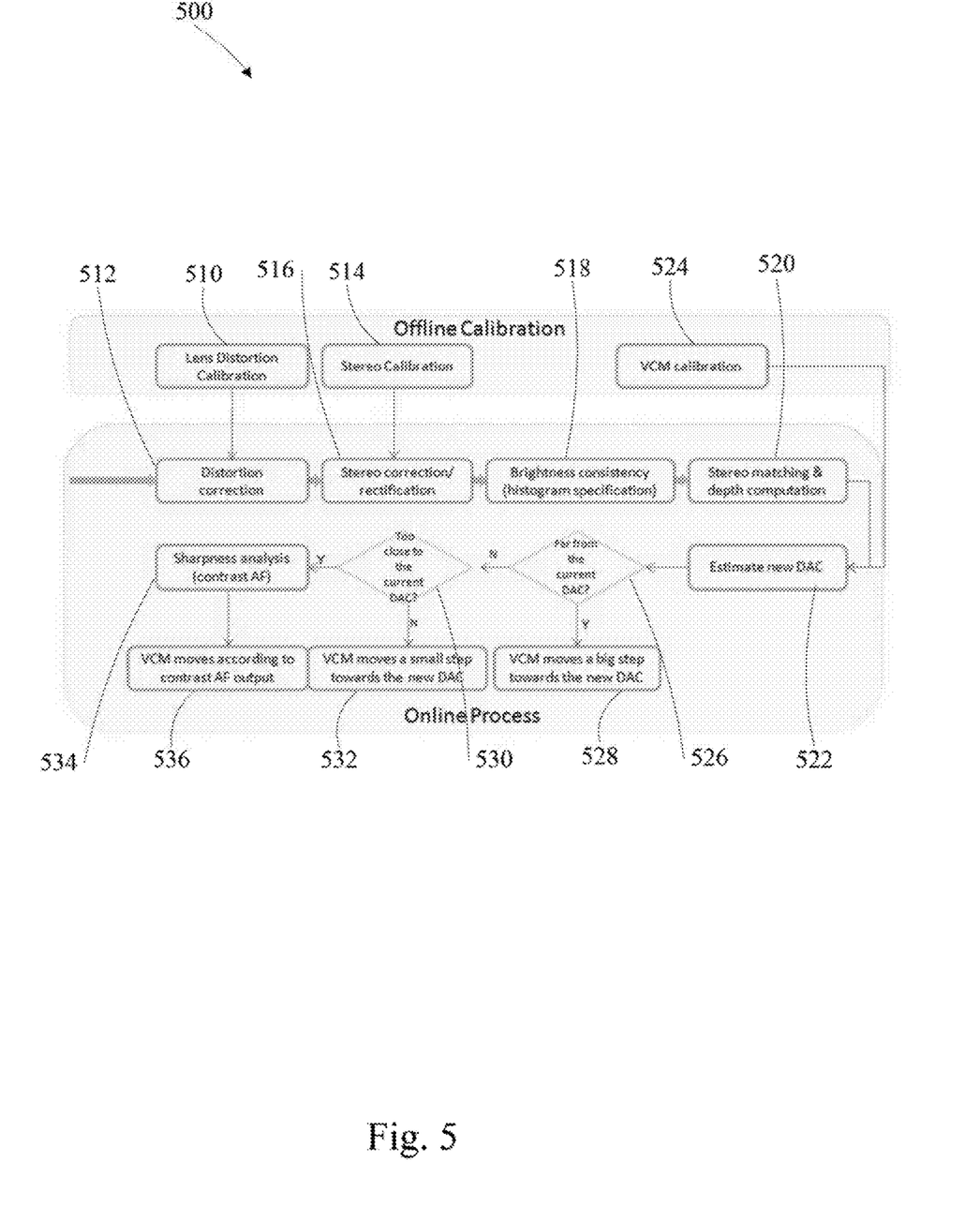
FIG. 5 is a first flow diagram in accordance with one embodiment of the disclosure.

FIG. 5 depicts an offline and online calibration. Offline calibration may comprise lens distortion calibration 510 to implement distortion correction 512, stereo calibration 514 to implement stereo correction and rectification 516, brightness correction 518 and VCM calibration 524. The offline calibration outputs the geometric relation between the two camera modules, including the focal length ratio between the two cameras, the rotation angles or rotation matrix between the two cameras, and the baseline optical center shift between the two cameras. Online calibration may encompass estimation of new camera movement positions 522, including distant movement 526 requiring a large motor movement 528, a fine movement 530 requiring a small motor movement 532 and sharpness analysis 534 which moves the VCM according to the contrast AF output 536.

Other operations may be used to reduce the calibration error. The estimated new lens position may be very useful to determine the motor movement direction when the motor position is far from in focus. A large step (coarse auto focus position step) may be used to move toward the target position. When the current motor position is near the target, the motor may be moved with a smaller step (fine auto focus position step) to avoid overshoot. Alternately, a fine sharpness analysis may be employed in the final interval.

Figure 6:
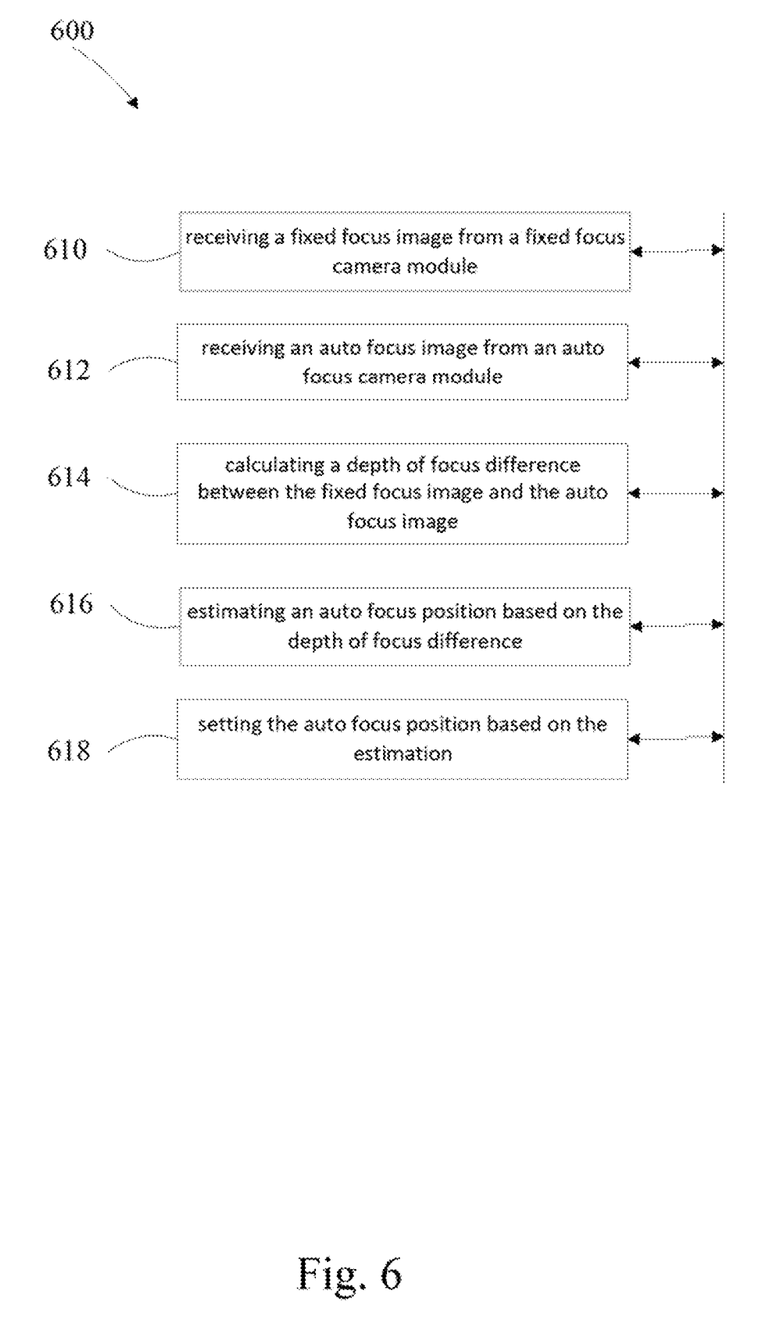
FIG. 6 is a second flow diagram in accordance with one embodiment of the disclosure.

FIG. 6 depicts a method of focusing dual cameras including receiving 610 a fixed focus image from a fixed focus camera module, 612 receiving an auto focus image from an auto focus camera module, 614 calculating a depth of focus difference between the fixed focus image and the auto focus image, 616 estimating an auto focus position based on the depth of focus difference and 618 setting the auto focus position based on the estimation.

Figure 7:
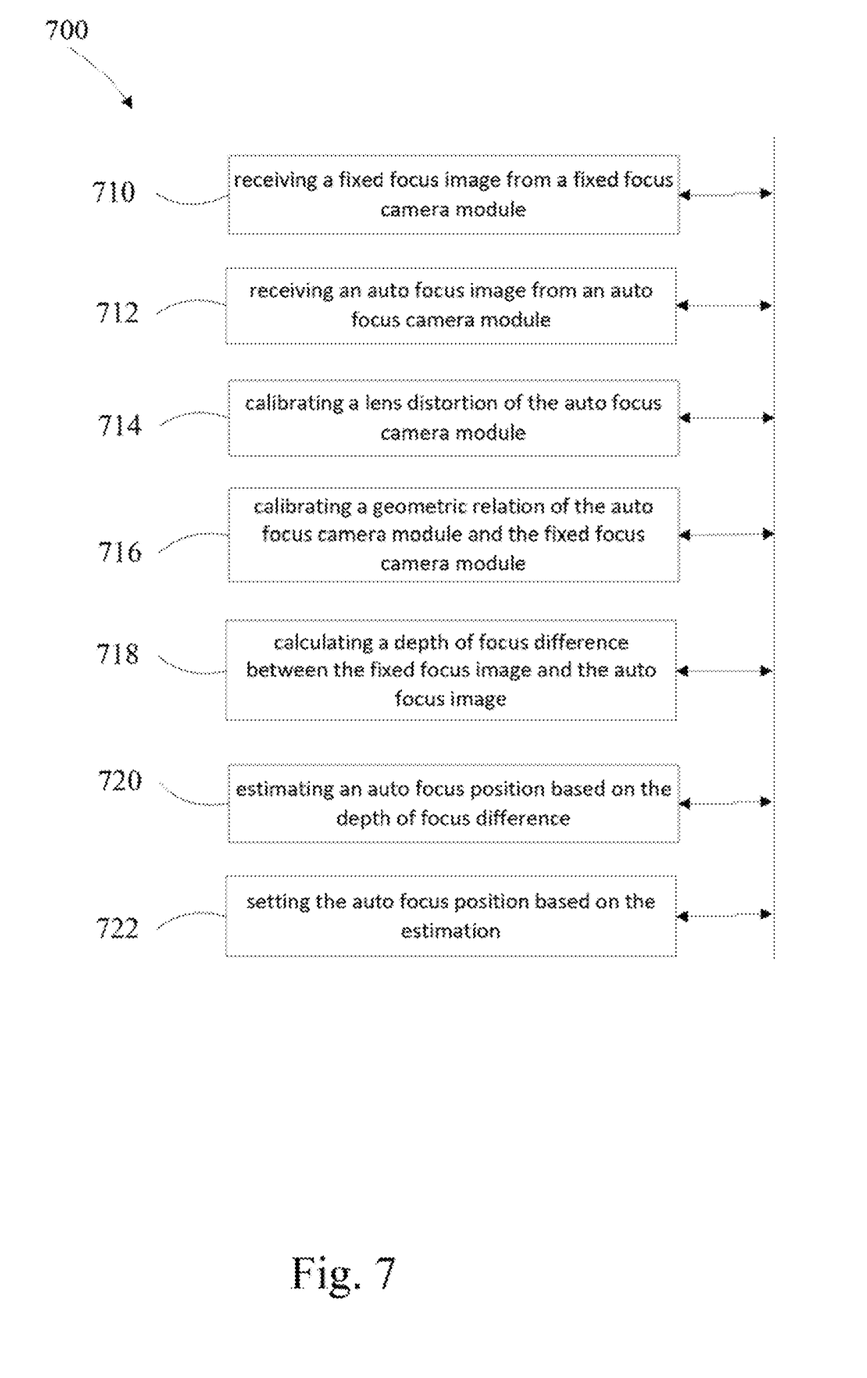
FIG. 7 is a third flow diagram in accordance with one embodiment of the disclosure.

FIG. 7 depicts a method of focusing dual cameras including receiving 710 a fixed focus image from a fixed focus camera module, receiving 712 an auto focus image from an auto focus camera module, calibrating 714 a lens distortion of the auto focus camera module, calibrating 716 a geometric relation of the auto focus camera module and the fixed focus camera module, calculating 718 a depth of focus difference between the fixed focus image and the auto focus image, estimating 720 an auto focus position based on the depth of focus difference and setting 722 the auto focus position based on the estimation.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent: to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of focusing dual cameras, comprising:
   receiving a fixed focus image from a fixed focus camera module;
   receiving an auto focus image from an auto focus camera module;
   calibrating a geometric relation including a relative pose, a relative position and a relative scale of the auto focus camera module and the fixed focus camera module, wherein the geometric relation comprises a focal length ratio between the auto focus camera module and the fixed focus camera module;
   aligning the fixed focus image and auto focus image along a baseline direction;
   window matching between the auto focus camera module and the fixed focus camera module, wherein the window matching is performed along an epipolar line;
   brightness correcting the matched windows between the auto focus camera module and the fixed focus camera module based on a histogram of a horizontal scan line within the matched window of a captured object;
   calculating a depth of focus difference between the matched windows the fixed focus image and the auto focus image;
   estimating an auto focus position based on the depth of focus difference, a current status of a camera pose and a motor calibration; and
   setting the auto focus position based on the estimation.

2. The method of focusing dual cameras of claim 1, further comprising calibrating a lens distortion of the auto focus camera module to imitate that of a pinhole camera.

3. The method of focusing dual cameras of claim 1, further comprising calibrating a geometric relation including a relative pose, a relative position and a relative scale of the auto focus camera module and the fixed focus camera module for stereo correction and rectification.

4. The method of focusing dual cameras of claim 3, wherein the geometric relation comprises a focal length ratio between the auto focus camera module and the fixed focus camera module.

5. The method of focusing dual cameras of claim 3, wherein the geometric relation comprises a set of rotation angles between the auto focus camera module and the fixed focus camera module.

6. The method of focusing dual cameras of claim 3, wherein the geometric relation comprises an optical center shift between the auto focus camera module and the fixed focus camera module.

7. The method of focusing dual cameras of claim 1, wherein the window matching between the auto focus camera module and the fixed focus camera module is performed along a horizontal epipolar line.

8. A method of focusing dual cameras, comprising:
   receiving a fixed focus image from a fixed focus camera module;
   receiving an auto focus image from an auto focus camera module;

calibrating a lens distortion of the auto focus camera module to imitate that of a pinhole camera;

calibrating a geometric relation including a relative pose, a relative position and a relative scale of the auto focus camera module and the fixed focus camera module, wherein the geometric relation comprises a focal length ratio between the auto focus camera module and the fixed focus camera module;

aligning the fixed focus image and auto focus image along a baseline directions window matching between the auto focus camera module and the fixed focus camera module, wherein the window matching is performed along an epipolar line;

brightness correcting between the auto focus camera module and the fixed focus camera module based on a histogram of a horizontal scan line from the auto focus camera module and the fixed focus camera module of a captured object;

calculating a depth of focus difference between the fixed focus image and the auto focus image;

estimating an auto focus position based on the depth of focus difference, a current status of a camera pose and a motor calibration; and setting, the auto focus position based on the estimation.

9. The method of focusing dual cameras of claim 8, wherein the geometric relation comprises a focal length ratio between die auto focus camera module and the fixed focus camera module for stereo correction and rectification.

10. The method of focusing dual cameras of claim 8, wherein the geometric relation comprises a set of rotation angles between the auto focus camera module and the fixed focus camera module.

11. The method of focusing dual cameras of claim 8, wherein the geometric relation comprises an optical center shift between the auto focus camera module and the fixed focus camera module.

12. The method of focusing dual cameras of claim 8, further comprising window matching between the auto focus camera module and the fixed focus camera module.

13. The method of focusing dual cameras of claim 8, further comprising calculating a brightness uniformity of the auto focus image.

14. The method of focusing dual cameras of claim 8, further comprising matching an alignment of the auto focus camera module and the fixed focus camera module.

15. The method of focusing dual cameras of claim 8, further comprising estimating an auto focus position step based on the estimated auto focus position.

16. The method of focusing dual cameras of claim 8, further comprising estimating a coarse auto focus position step based on the estimated auto focus position.

17. The method of focusing dual cameras of claim 8, further comprising estimating a fine auto focus position step based on the estimated auto focus position.

18. The method of focusing dual cameras of claim 8, further comprising calculating a sharpness of the auto focus image.

19. The method of focusing dual cameras of claim 18, further comprising resetting the auto focus position based on the sharpness of the auto focus image.

* * * * *